(12) United States Patent
Hackett

(10) Patent No.: US 8,277,128 B2
(45) Date of Patent: Oct. 2, 2012

(54) BLOCK-OUT DEVICE FOR FIBER OPTIC CONNECTOR

(75) Inventor: Jason O. Hackett, Canton, GA (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 13/185,973

(22) Filed: Jul. 19, 2011

(65) Prior Publication Data

US 2011/0274401 A1 Nov. 10, 2011

Related U.S. Application Data

(63) Continuation of application No. 12/404,768, filed on Mar. 16, 2009, now Pat. No. 7,993,063.

(51) Int. Cl.
*G02B 6/38* (2006.01)
*G02B 6/36* (2006.01)

(52) U.S. Cl. ............................................. 385/58; 385/92

(58) Field of Classification Search .................... 385/58, 385/92
See application file for complete search history.

(56) References Cited

U.S. PATENT DOCUMENTS

| 3,570,096 A | 3/1971 | Sosinski |
|---|---|---|
| 3,951,514 A | 4/1976 | Medina, Jr. |
| 4,155,159 A | 5/1979 | Hogan et al. |
| 4,311,883 A | 1/1982 | Kidney |
| 4,624,516 A | 11/1986 | White |
| 4,713,016 A | 12/1987 | Kato |
| 4,789,348 A | 12/1988 | Hampton |
| 4,846,708 A | 7/1989 | Marson et al. |
| 4,870,840 A | 10/1989 | Klein |
| 4,887,972 A | 12/1989 | McLean et al. |
| 4,964,284 A | 10/1990 | McDaid |
| 5,076,656 A * | 12/1991 | Briggs et al. ..................... 385/71 |
| 5,190,465 A | 3/1993 | Davidge et al. |
| 5,220,815 A | 6/1993 | Davidge et al. |
| 5,265,328 A | 11/1993 | Gorman |
| 5,288,241 A | 2/1994 | Davidge et al. |
| 5,305,380 A | 4/1994 | Hileman et al. |
| 5,340,324 A | 8/1994 | Fields et al. |
| 5,420,951 A | 5/1995 | Marazzi et al. |
| 5,429,522 A | 7/1995 | Noschese et al. |
| 5,556,295 A | 9/1996 | McFadden et al. |
| 5,637,002 A | 6/1997 | Buck et al. |
| 5,984,705 A | 11/1999 | Miyazaki et al. |
| 6,019,521 A * | 2/2000 | Manning et al. ................. 385/77 |
| 6,079,881 A * | 6/2000 | Roth .............................. 385/76 |

(Continued)

FOREIGN PATENT DOCUMENTS

EP         1762871 A1    3/2007

*Primary Examiner* — K. Cyrus Kianni
(74) *Attorney, Agent, or Firm* — Robert A. McCann; Christopher S. Clancy; Aimee E. McVady

(57) ABSTRACT

The present invention is directed toward a device for protecting an adapter from contamination, damage or misuse. The device includes a front member having an opening for receiving a removal tool. The device also includes cover members having a front portion and a back portion. The front member of the device interconnects the front portions of the cover members. The front portion of each cover member includes a sealing member for sealing an opening in the adapter when the cover member is installed within the adapter. The back portion of each cover member includes an arm extending upwardly therefrom for engaging the adapter to secure the device within the adapter.

11 Claims, 15 Drawing Sheets

U.S. PATENT DOCUMENTS

| | | |
|---|---|---|
| 6,227,717 B1 | 5/2001 | Ott et al. |
| 6,309,247 B1 | 10/2001 | Wang |
| 6,789,950 B1 * | 9/2004 | Loder et al. .................. 385/53 |
| 6,896,535 B2 | 5/2005 | Yamada et al. |
| 6,913,393 B2 | 7/2005 | Buck et al. |
| 6,918,703 B2 * | 7/2005 | Chen et al. .................... 385/78 |
| 6,942,395 B1 * | 9/2005 | Chuan et al. .................. 385/53 |
| 7,074,066 B2 * | 7/2006 | Pepe ............................. 439/321 |
| 7,354,291 B2 | 4/2008 | Caveney et al. |
| 7,438,584 B2 | 10/2008 | Caveney et al. |
| 2002/0191919 A1 * | 12/2002 | Nolan ............................. 385/78 |
| 2003/0002808 A1 * | 1/2003 | Lampert et al. ................ 385/70 |
| 2003/0171022 A1 * | 9/2003 | Distad et al. ................. 439/372 |
| 2003/0231839 A1 * | 12/2003 | Chen et al. .................... 385/78 |
| 2004/0081406 A1 * | 4/2004 | Grob et al. .................... 385/76 |
| 2005/0018973 A1 * | 1/2005 | Loder et al. ................... 385/53 |
| 2005/0232551 A1 | 10/2005 | Chang et al. |
| 2006/0025003 A1 | 2/2006 | Liao |
| 2006/0040564 A1 | 2/2006 | Morrison et al. |
| 2006/0257079 A1 * | 11/2006 | Ohtsuka et al. ............... 385/86 |
| 2008/0050070 A1 * | 2/2008 | Gurreri et al. ................. 385/55 |
| 2008/0145002 A1 * | 6/2008 | Ice .................................. 385/92 |
| 2008/0310795 A1 * | 12/2008 | Parkman et al. .............. 385/60 |
| 2009/0004904 A1 | 1/2009 | Caveney et al. |
| 2009/0007609 A1 | 1/2009 | Obenshain |
| 2009/0047818 A1 | 2/2009 | Irwin et al. |
| 2009/0148102 A1 * | 6/2009 | Lu et al. ........................ 385/60 |

* cited by examiner

BLOCK-OUT DEVICE FOR FIBER OPTIC CONNECTOR

CROSS-REFERENCE TO RELATED APPLICATIONS

This application claims priority to U.S. application Ser. No. 12/404,768, filed Mar. 16, 2009, the subject matter of which is hereby incorporated by reference in its entirety.

FIELD OF THE INVENTION

The present invention relates to a block-out device, and more particularly to a block-out device for a fiber optic adapter.

BACKGROUND OF THE INVENTION

Block-out covers are frequently inserted into jack modules to protect the jack module and prevent entry of undesirable objects. Some covers include multiple parts or special latch connectors that secure the cover to the jack modules. Other covers have relatively large open areas designed to receive a flat tool that would enable the end user to release the cover from the jack module so that it could be removed from the jack module. The covers with the larger open areas, however, may be accidentally removed from the jack module. There are also covers that are inserted in the opening of a jack module and then locked by a rotating key. These covers may only be removed by inserting the key and rotating it to unlock or release the cover from the jack module. Dust covers or block-out covers have also been used to prevent optical fiber adapters and connectors from being contaminated. The prior art dust covers often do not provide an adequate seal thereby allowing dust or other material to contaminate the adapter or the connector. Prior art dust covers are also typically difficult to install and remove from the adapter or the connector.

Thus, it is desirable to provide a tamper resistant block-out cover for a fiber optic adapter that prevents contamination, damage or misuse of the adapter. It would also be desirable to provide a block-out cover and a removal tool where the cover would not be accidentally removed from the adapter but would be easily removed from the adapter by a simple tool.

SUMMARY OF THE INVENTION

The present invention is directed towards a device that protects an adapter from contamination, damage or misuse. The device includes a front member having an opening for receiving a removal tool. The device also includes cover members with a front portion and a back portion. The front member of the device interconnects the front portions of the cover members. The back portion of each cover member includes an arm extending upwardly therefrom for engaging the adapter to secure the device within the adapter. The arm also includes a downwardly extending member with a flange positioned at an end. The front portion of each cover member includes a sealing member for sealing an opening in the adapter when the cover member is installed within the adapter.

DETAILED DESCRIPTION

Figure 1:
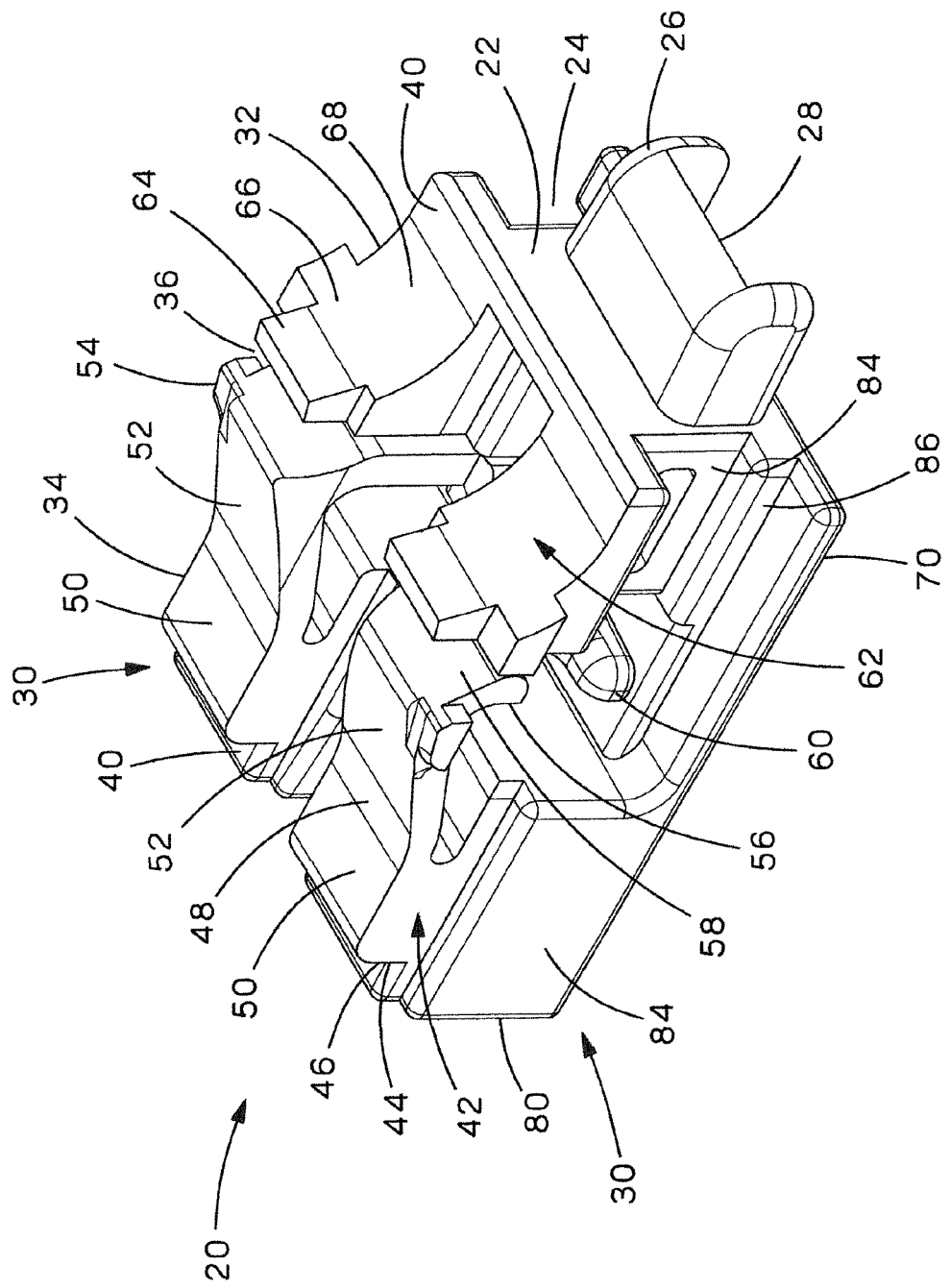
FIG. 1 illustrates a front perspective view of the fiber optic block-out device of the present invention.
Figure 2:
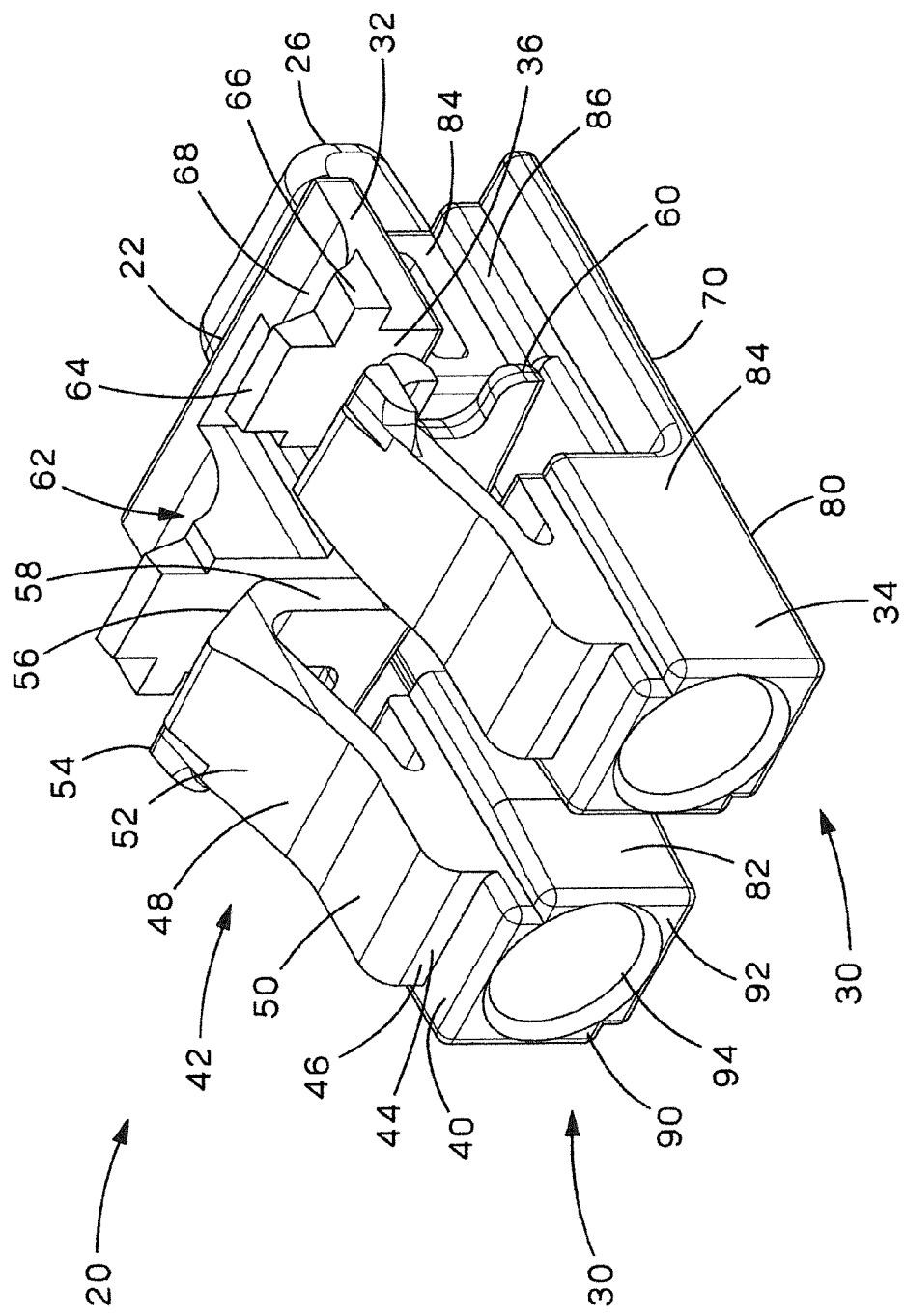
FIG. 2 illustrates a rear perspective view of the fiber optic block-out device of FIG. 1.

FIGS. 1 and 2 illustrate the LC fiber optic block-out device 20 of the present invention. The block-out device 20 includes two identical block-out covers 30. Each block-out cover 30 has a front portion 32 and a back portion 34 with an open area 36 therebetween. The block-out device 20 also includes a front member 22 or bar that interconnects the front portions 32 of the block-out covers 30.

Figure 11:
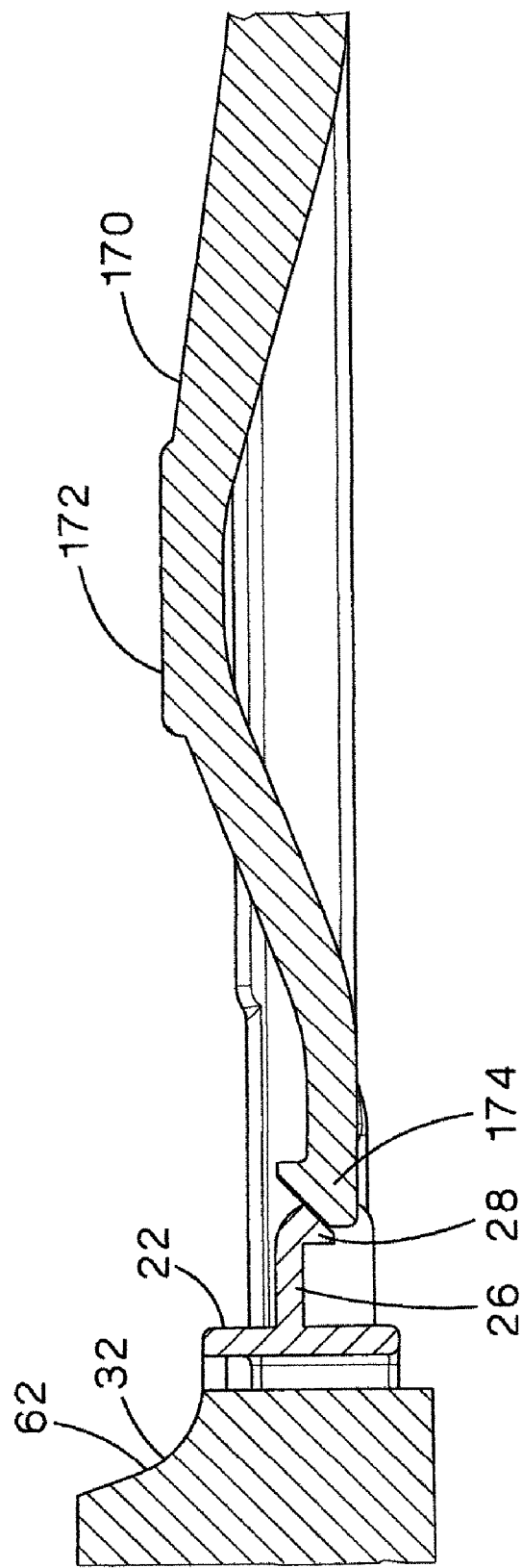
FIG. 11 illustrates a cross sectional view of the block-out removal tool partially installed in the fiber optic block-out device taken along line 11-11 of FIG. 9.

The front member 22 of the block-out device 20 is substantially rectangular with an open area 24 at each side for receiving a removal tool 160. The front member 22 of the block-out device 20 also includes a removal tool attachment or connection member 26. The attachment member 26 includes a downwardly facing hook 28 (see FIG. 11) for engaging the removal tool 160. As described below, the attachment member 26 enables the removal tool 160 to be attached to the block-out device 20 for easy removal from the adapter 100.

The front portion 32 and the back portion 34 of each block-out cover 30 includes a top 40, a bottom 70, sidewalls 80 and a back 90. A molded spring latch or locking arm 42 extends from the top 40 of the back portion 34 of each block-out cover 30. As illustrated in FIGS. 1 and 2, the molded spring latches 42 include a first portion 44, a second portion 48 and a third portion 56. The first portion 44 includes a vertically extending member 46 that extends upward from the top 40 of the block-out cover 30. The second portion 48 includes a horizontally extending member 50 and an upwardly extending member 52 with a shoulder 54. The horizontally extending member 50 extends from one end of the first portion 44 to one end of the upwardly extending member 52. The upwardly extending member 52 extends from the horizontally extending member 50 upwards toward the front portion 32 of the block-out cover 30. The third portion 56 includes a downwardly extending member 58 that extends downwardly from one end of the upwardly extending member 52 of the second portion 48. The downwardly extending member 58 is substantially parallel to the vertically extending member 46 of the spring latch 42. The downwardly extending member 58 is positioned within the open area 36 between the front portion 32 and the back portion 34 of the block-out cover 30. The third portion 56 also includes a flange 60 that extends outwardly toward the outer sidewall 84 of the block-out cover 30.

Figure 3:
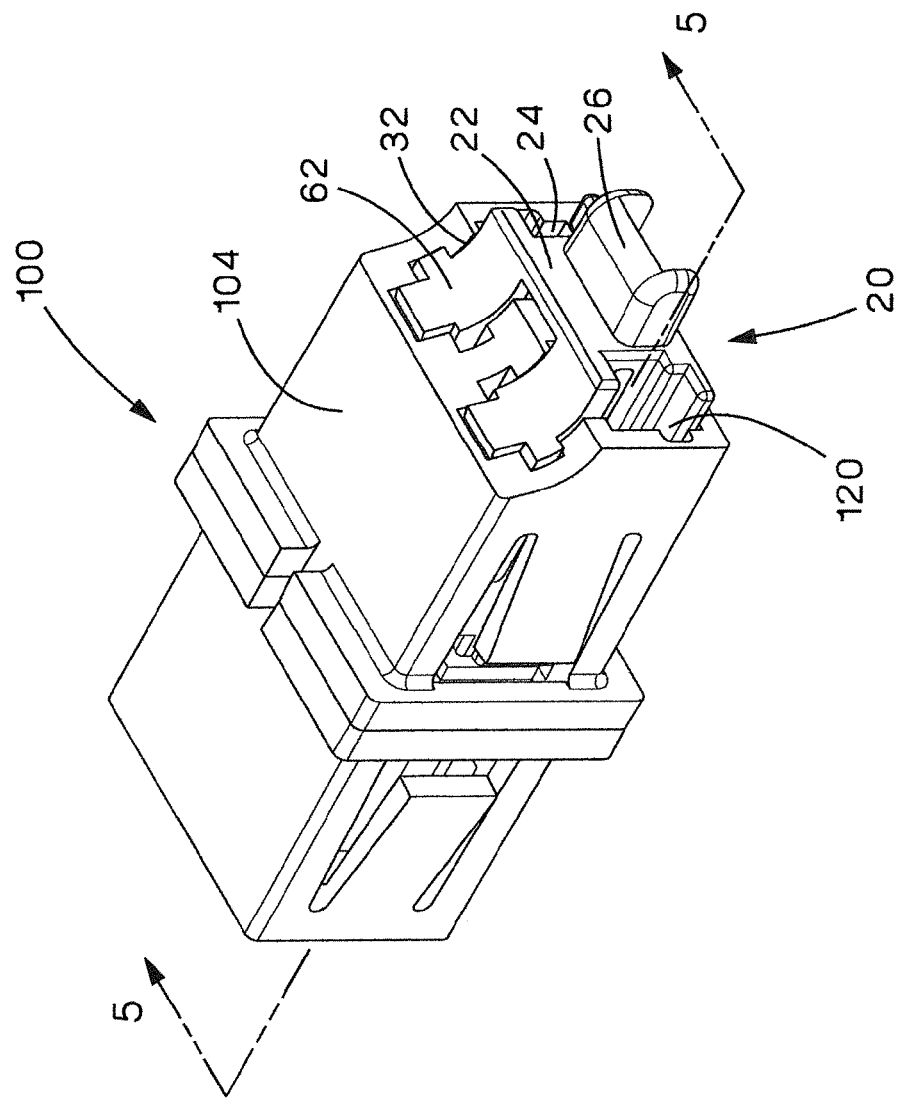
FIG. 3 illustrates a front perspective view of the fiber optic block-out device of FIG. 1 installed in a fiber optic adapter.

The top 40 of each front portion 32 of the block-out covers 30 include a sealing member 62. As illustrated in FIG. 3, the sealing members 62 are designed to matingly engage the openings 102 in a LC fiber optic duplex adapter 100 thereby preventing the adapter 100 from becoming contaminated. The sealing members 62 are spaced from the spring latches 42 with the opening area 36 therebetween. The sealing members 62 include a vertical portion 64, a horizontal portion 66 and an arcuate or sloped portion 68 that extends from the vertical portion 64 to the front member 22 of the block-out device 20.

The front portion 32 and the back portion 34 of the block-out covers include an inner sidewall 82 and an outer sidewall 84 with the open area 36 therebetween. The outer sidewall 84 of the front portion 32 includes a stepped receiving area 86. As discussed below, each stepped receiving area 86 receives one of the prongs 180 of the removal tool 160.

The back 90 of each block-out cover 30 includes a rectangular cross section 92 with a circular opening 94. As discussed below, the circular openings 94 receive the ferrule holders 108 in the adapter 100 when the block-out device 20 is installed in the adapter 100.

Figure 4:
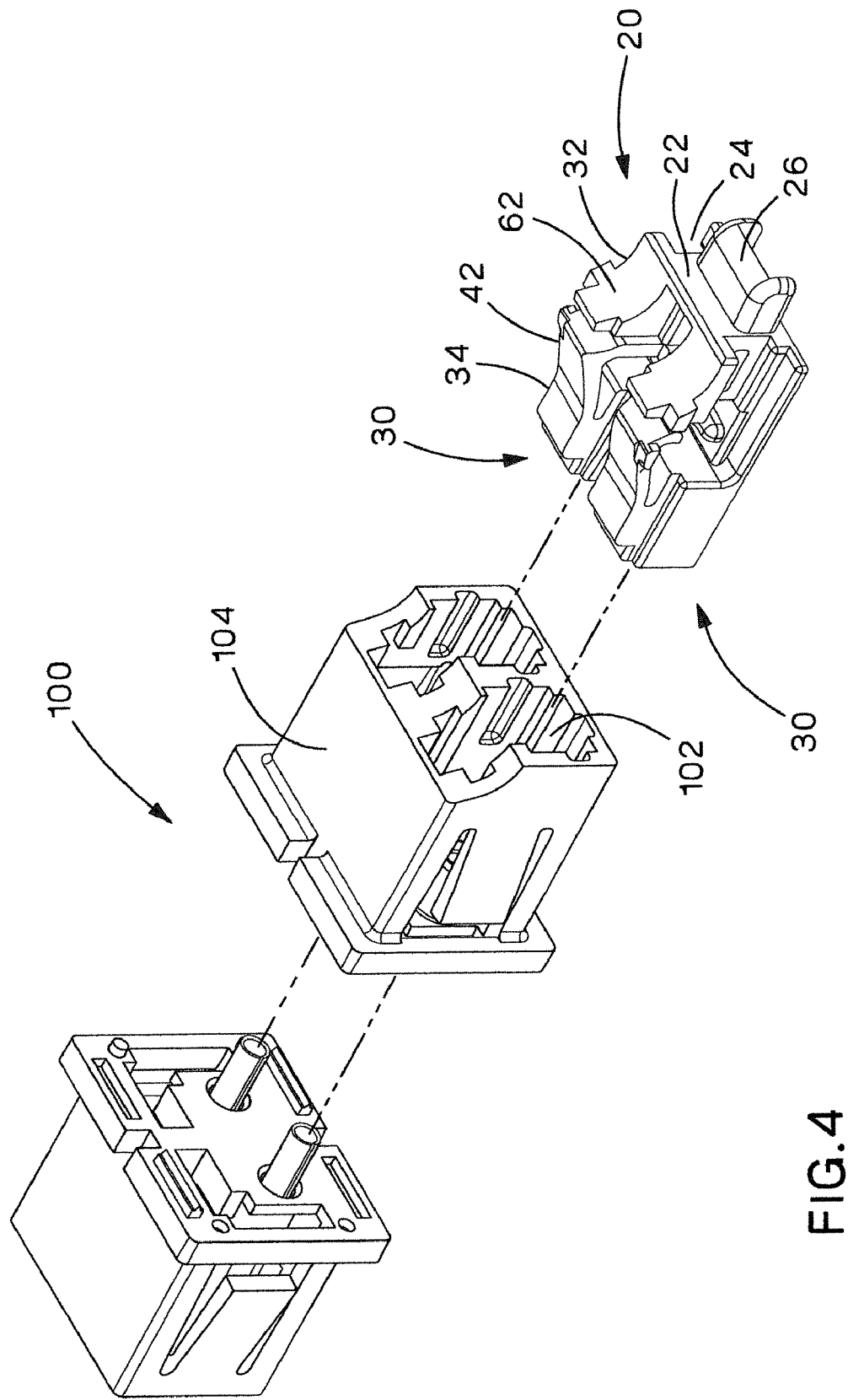
FIG. 4 illustrates an exploded view of the fiber optic block-out device and adapter of FIG. 3.
Figure 5:
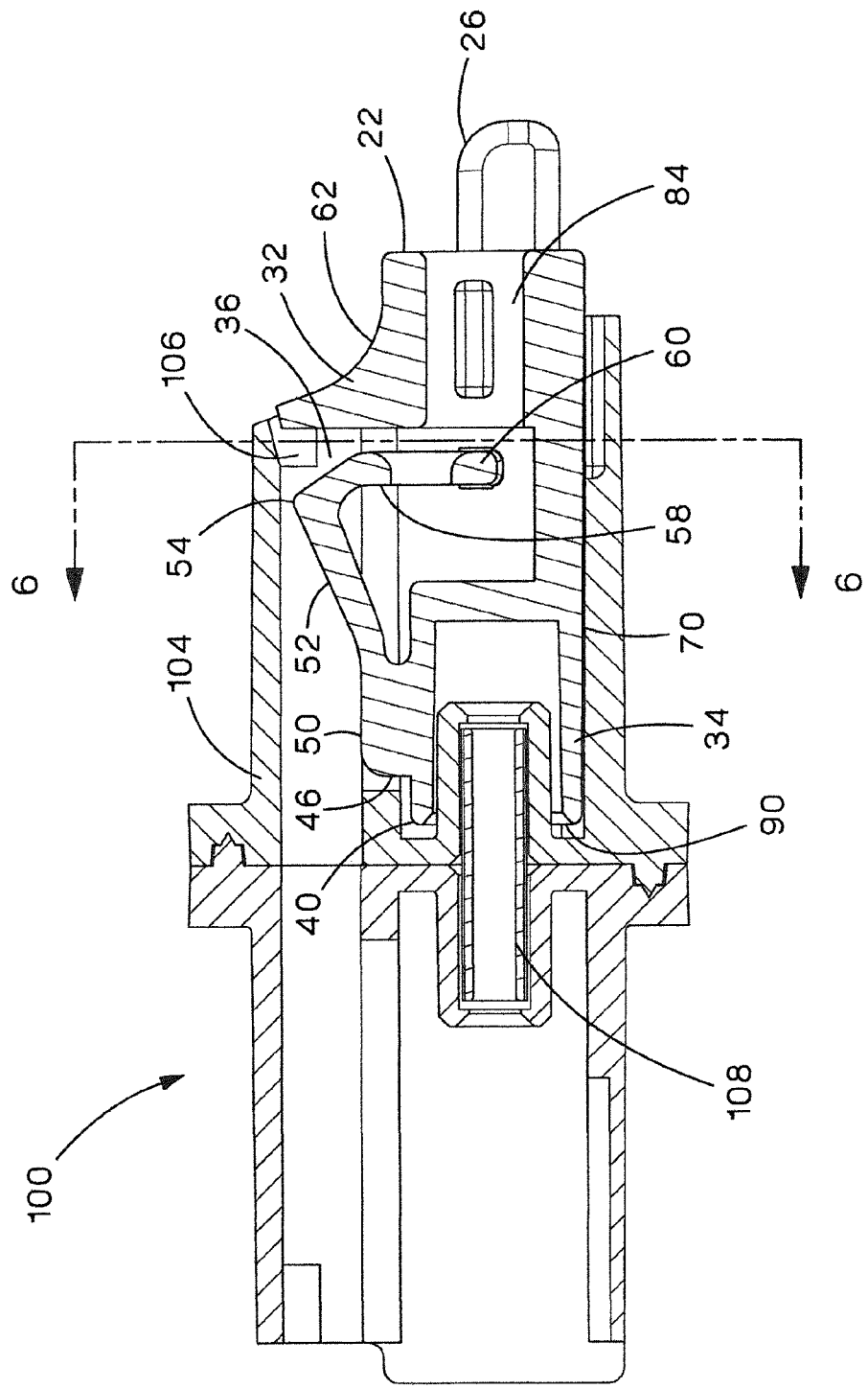
FIG. 5 illustrates a cross sectional view of the fiber optic block-out device and adapter taken along line 5-5 in FIG. 3.
Figure 6:
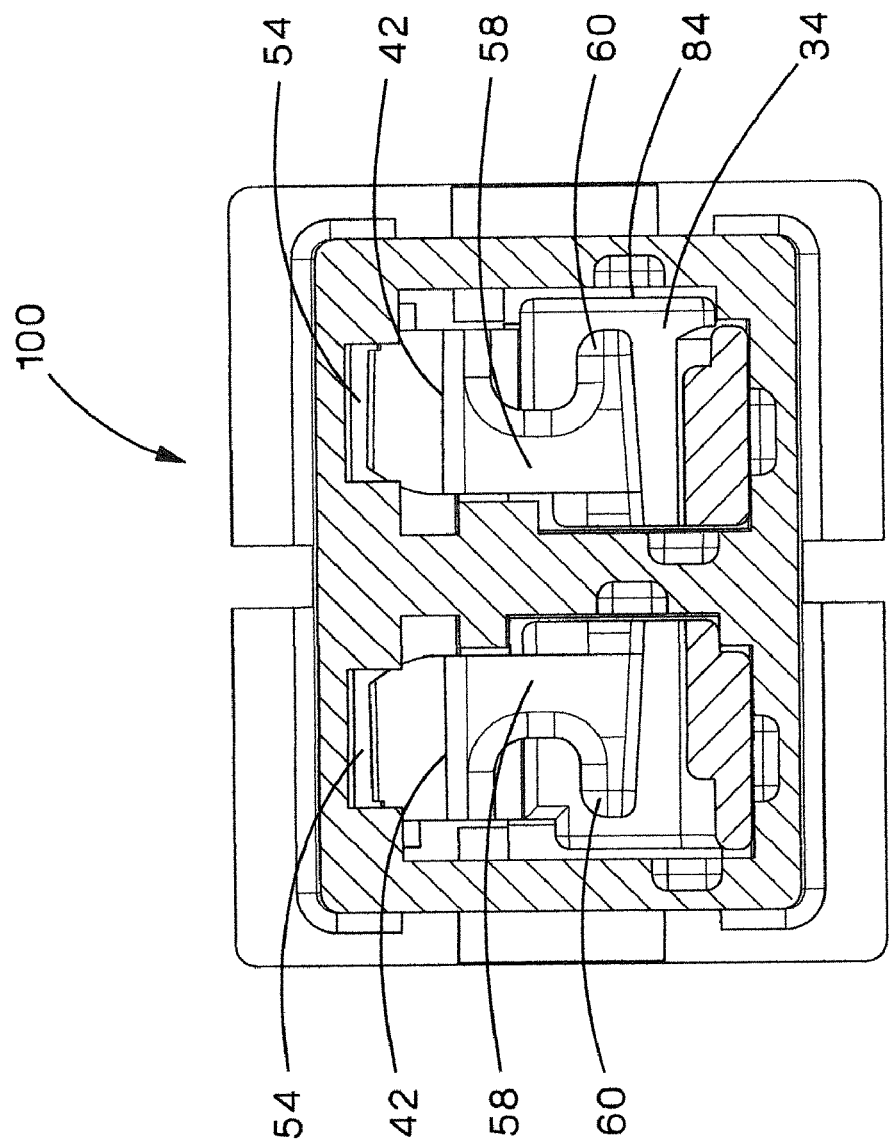
FIG. 6 illustrates a cross sectional view of the fiber optic block-out device and adapter taken along line 6-6 in FIG. 5.

FIGS. 3-6 illustrate the block-out device 20 of the present invention with the LC fiber optic duplex adapter 100. FIG. 3 illustrates the block-out device 20 installed in the LC fiber optic duplex adapter 100. FIG. 4 illustrates an exploded view of the adapter 100 and the block-out device 20. FIGS. 5 and 6 illustrate a cross sectional view of the block-out device 20 installed in the adapter 100. As the block-out device 20 is being installed in the adapter 100, the upwardly extending member 52 of the spring latches 42 are deflected downward in the open area 36 as the block-out device 20 passes the latch 106 extending from the top surface 104 of the adapter 100. Once the spring latches 42 clear the latch 106 extending from the top surface 104 of the adapter 100, the upwardly extending members 52 of the spring latches 42 return to their original position. As illustrated in FIG. 5, the shoulder 54 of the upwardly extending member 52 is positioned behind the latch 106 extending from the top surface 104 of the adapter 100. As a result, the block-out device 20 is locked in the adapter 100 thereby protecting the adapter 100 from contamination, damage or misuse.

FIG. 5 also illustrates the circular opening 94 of the back 90 of the block-out cover 30 receiving the ferrule holder 108 in the adapter 100.

Figure 7:
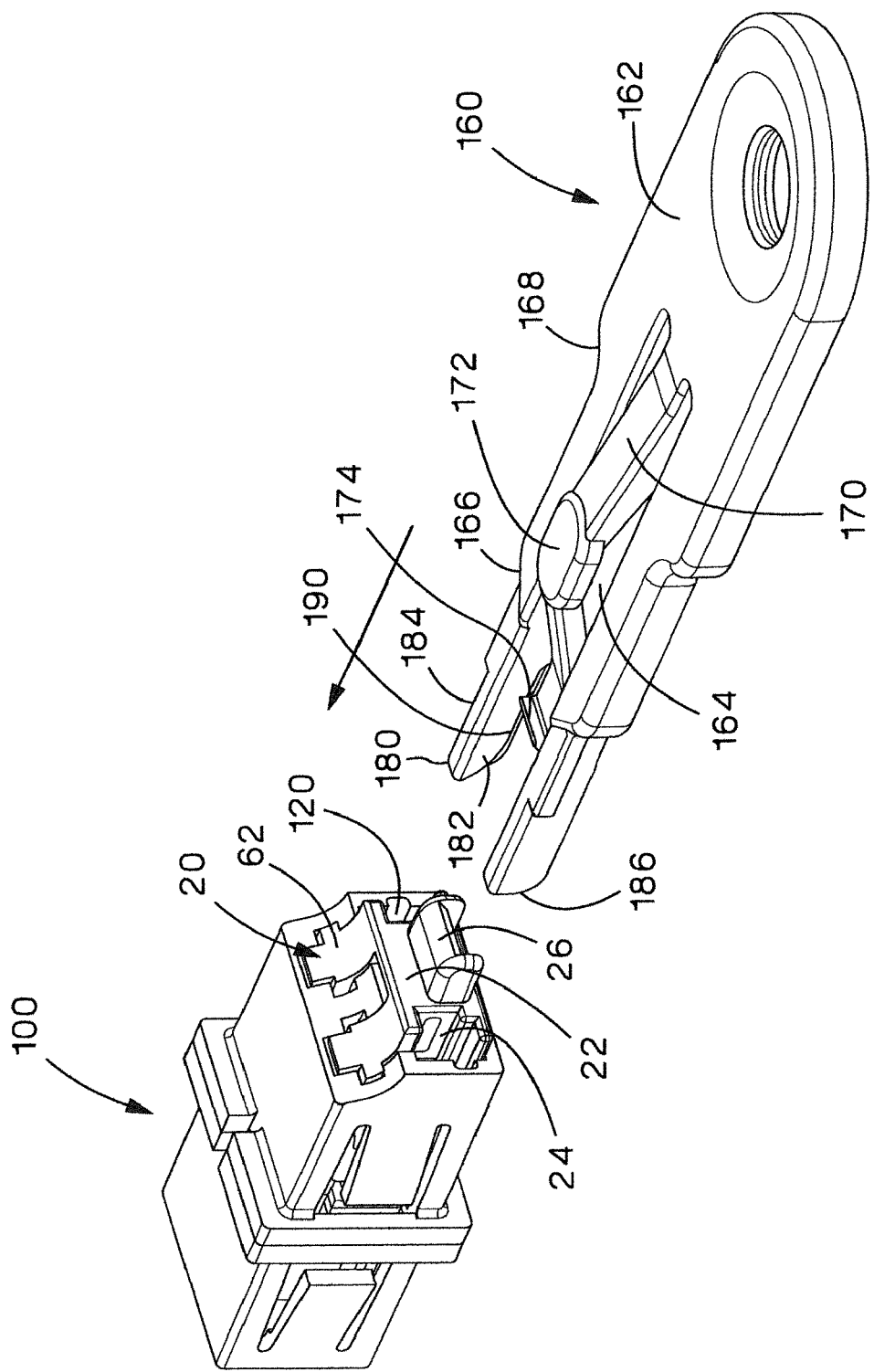
FIG. 7 illustrates a front perspective view of the fiber optic block-out device of FIG. 1 installed in the adapter and a block-out removal tool positioned to be installed in the device.
Figure 8:
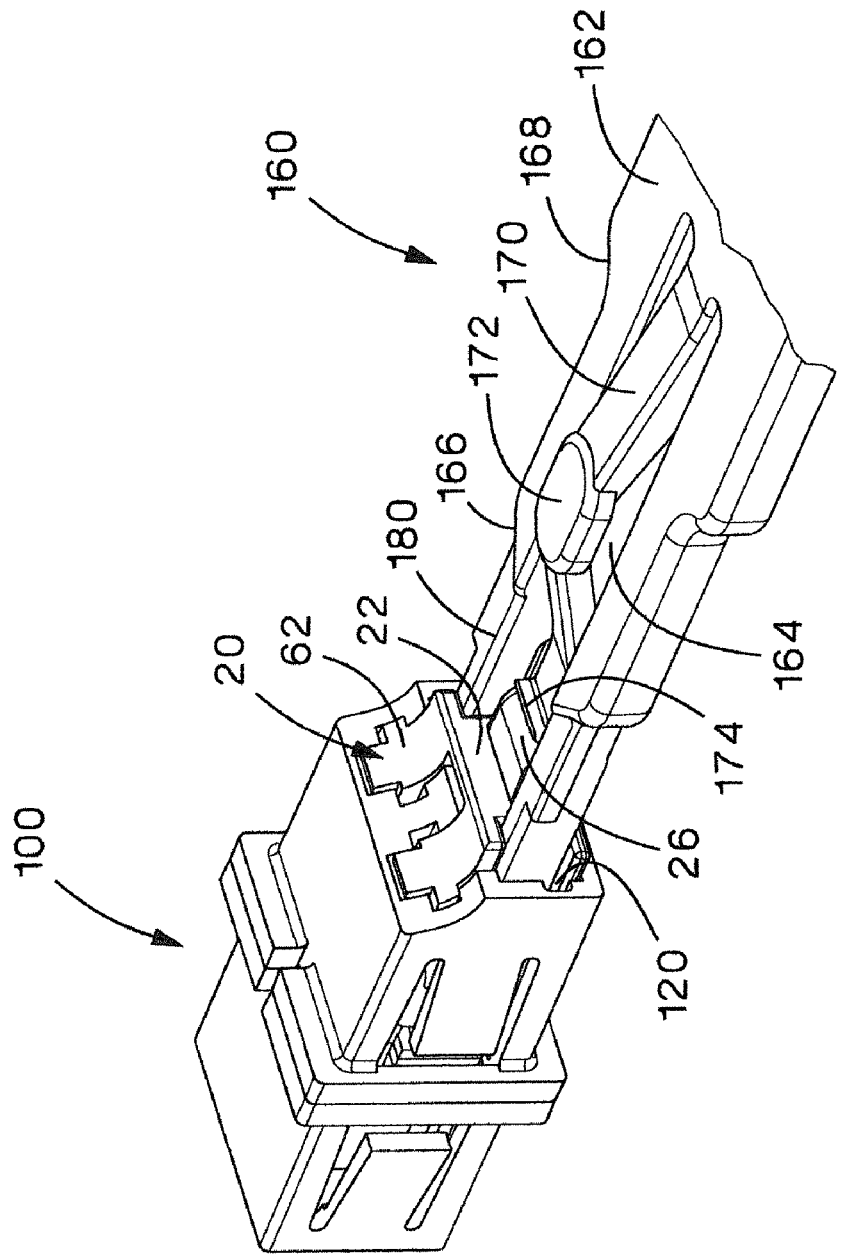
FIG. 8 illustrates a front perspective view of the block-out removal tool partially installed in the fiber optic block-out device of FIG. 7.
Figure 9:
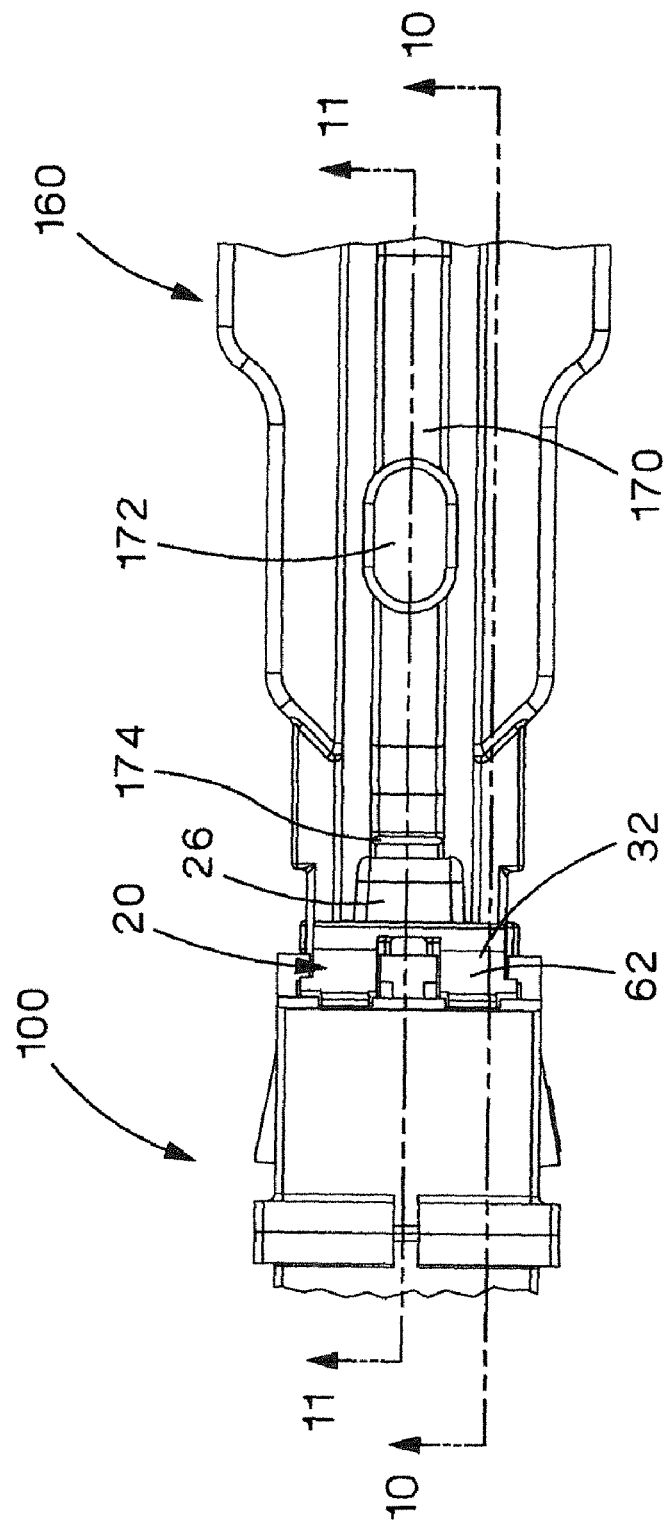
FIG. 9 illustrates a top plan view of the block-out removal tool partially installed in the fiber optic block-out device of FIG. 8.
Figure 10:
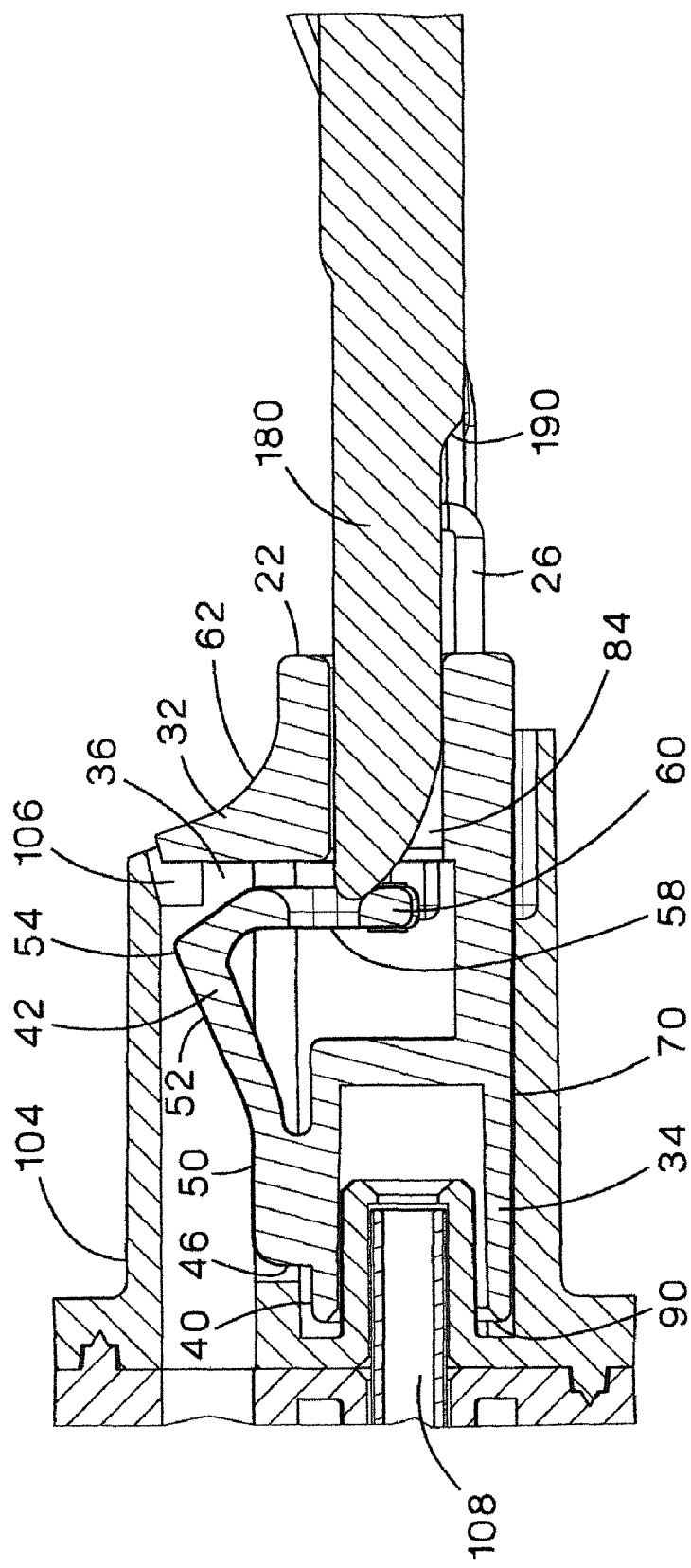
FIG. 10 illustrates a cross sectional view of the block-out removal tool partially installed in the fiber optic block-out device taken along line 10-10 of FIG. 9.

FIGS. 7-15 illustrate the block-out device 20 with the fiber optic duplex adapter 100 and the removal tool 160. The removal tool 160 is similar to the removal tool described in commonly owned U.S. patent application Ser. No. 11/207,853, the contents of which are herein incorporated by reference. FIG. 7 illustrates the removal tool 160 positioned to be inserted in the tool insertion slots 120 defined by the outer sidewalls 84 of the front portions 32 of the block-out covers 30 and the LC fiber optic duplex adapter 100.

The removal tool 160 includes a body 162 with an opening 164 in the center of the removal tool 160 and angled front edges 166, 168. The removal tool 160 also includes a release lever 170 positioned within the opening 164 and prongs 180 that extend outwardly from the front edge 166 of the removal tool 160. The release lever 170 has a raised knob 172 located near the center of the lever 170 and an upwardly facing hook 174 located at the free end of the lever 170. The prongs 180 include an inner side 182, an outer side 184 and a front end 186. The inner side 182 of each prong includes a curved or cam surface 190 that extends from the front end 186 of each prong 180 downwards towards the front edge 166 of the tool 160.

FIGS. 8-11 illustrate the removal tool 160 partially installed in the block-out device 20. As the removal tool 160 is installed in the block-out device 20, the prongs 180 engage the flanges 60 extending outwardly from the downwardly extending members 58 of the spring latches 42 to deflect the spring latches 42. Also, as the removal tool 160 is installed, the hook 174 of the release lever 170 contacts the attachment member 26 (see FIG. 11) extending from the front member 22 of the block-out device 20.

Figure 12:
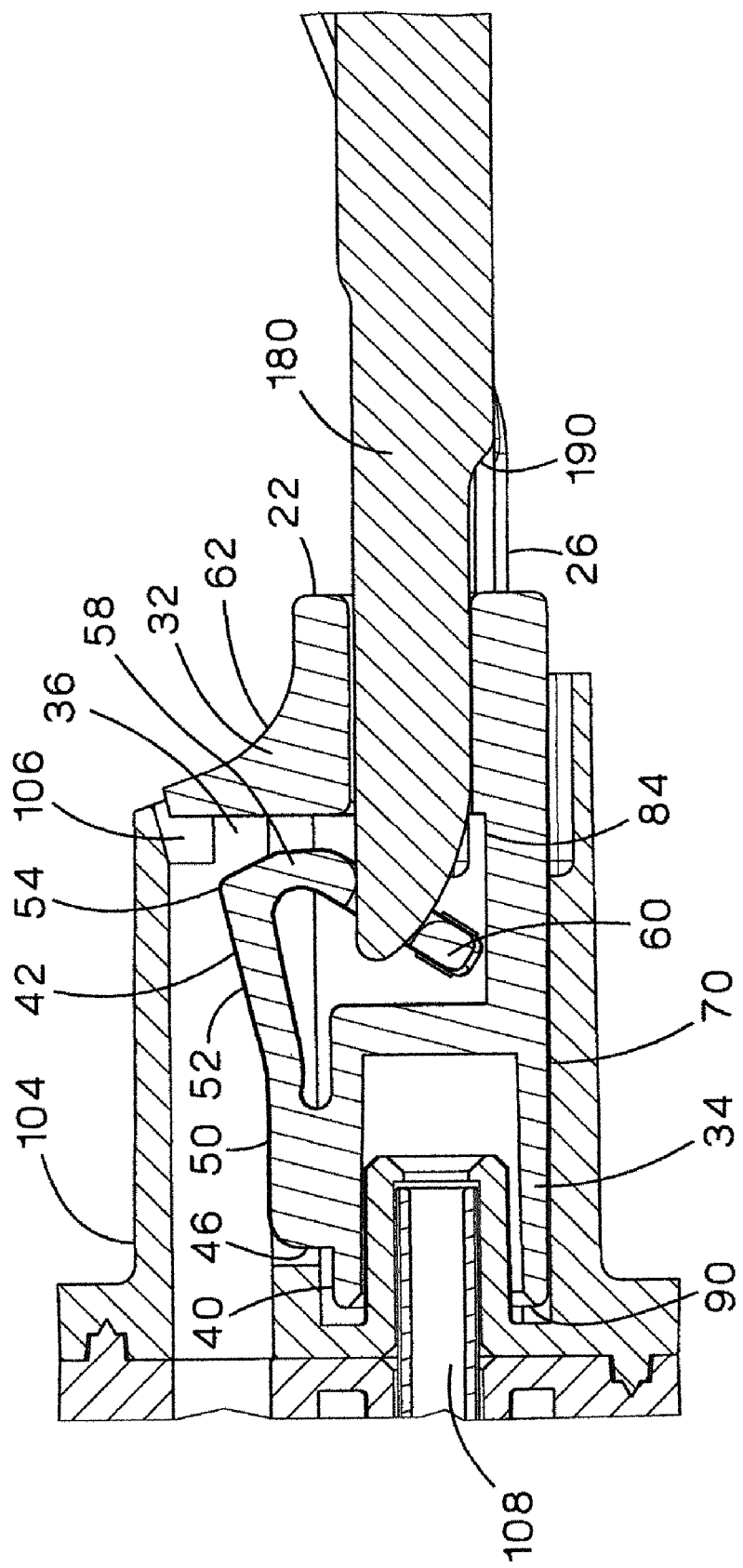
FIG. 12 illustrates a cross sectional view of the block-out removal tool installed in the fiber optic block-out device of FIG. 7.
Figure 13:
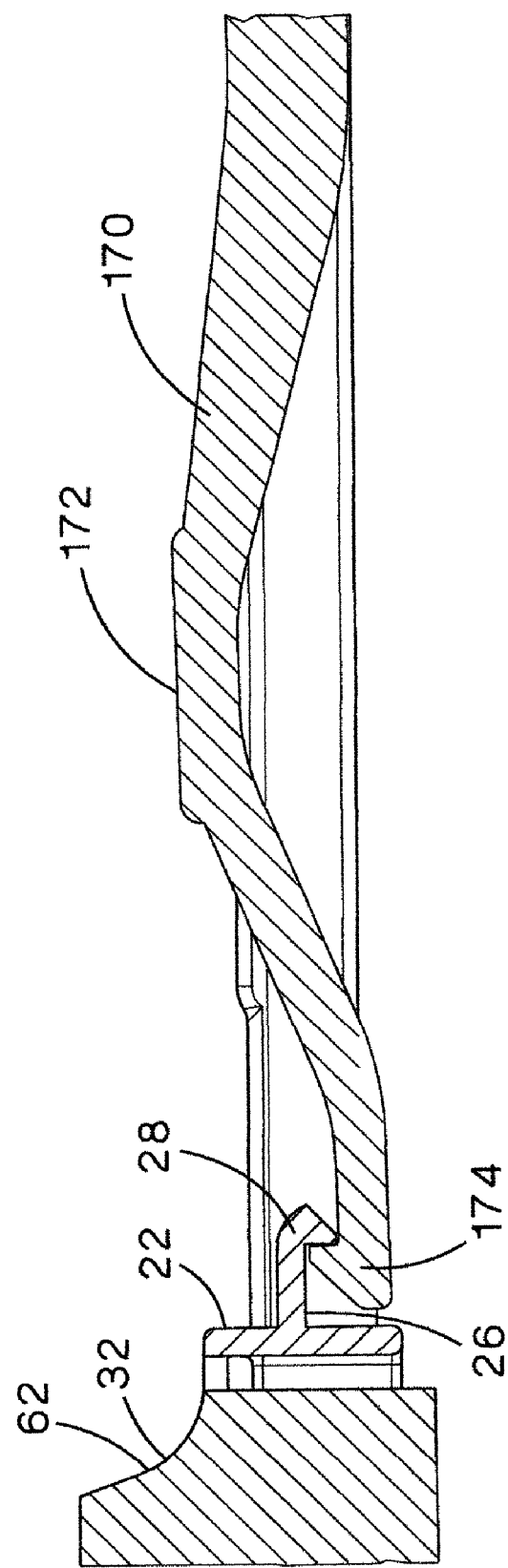
FIG. 13 illustrates a cross sectional view of the block-out removal tool installed in the fiber optic block-out device of FIG. 7.

FIGS. 12 and 13 illustrate the removal tool 160 fully installed in the block-out device 20. When the removal tool 160 is fully installed, the prongs 180 of the removal tool 160 engage the flanges 60 extending from the downwardly extending member 58 to deflect the upwardly extending member 52 and shoulder 54 downward away from the latch 106 extending from the top 104 of the adapter 100. The hook 174 of the removal tool 160 engages the hook 28 of the attachment member 26 to secure the removal tool 160 to the block-out device 20.

Figure 14:
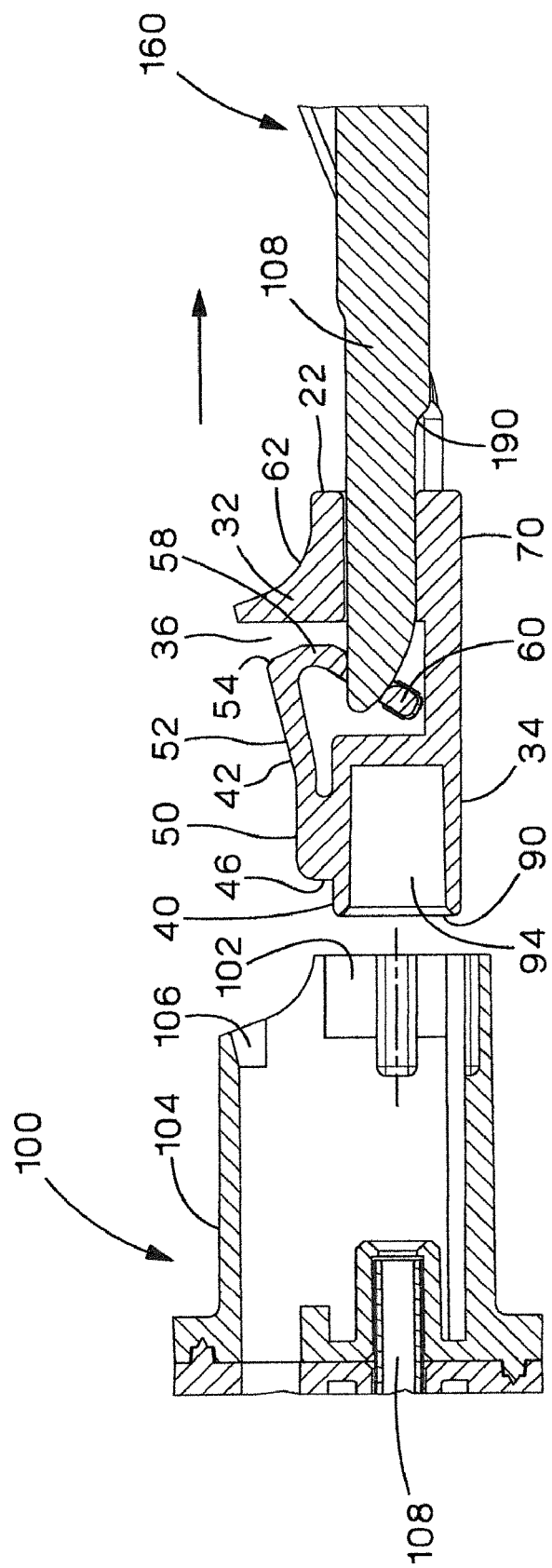
FIG. 14 illustrates a cross sectional view of the block-out removal tool installed in the fiber optic block-out device of FIG. 12 being removed from the adapter.
Figure 15:
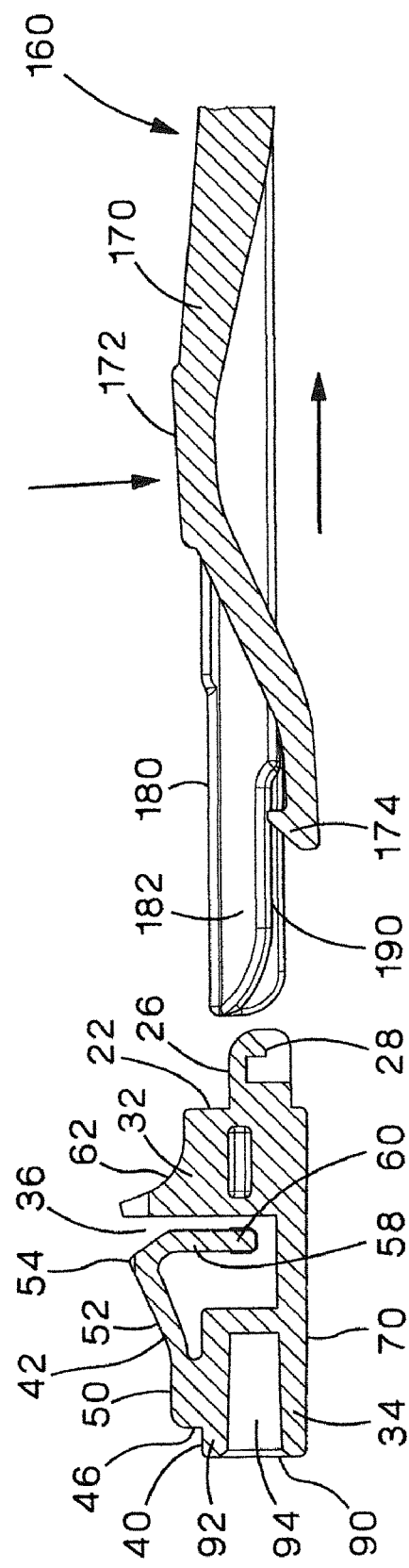
FIG. 15 illustrates a cross sectional view of the block-out removal tool of FIG. 14 released from the fiber optic block-out device.

As illustrated in FIG. 14, once the removal tool 160 is fully installed and the spring latches 42 have been deflected, the block-out device 20 and attached removal tool 160 may be removed from the adapter 100. As illustrated in FIG. 15, once the block-out device 20 has been removed from the adapter 100, the raised knob 172 of the release lever 170 may be depressed to disengage the hook 174 of the removal tool 160 from the hook 28 of the attachment member 26 extending from the front member 22 of the block-out device 20.

The removal tool and the block-out device of the present invention provide a safe and secure device for blocking fiber optic adapters. The block-out device is designed so that it may only be removed with the two pronged removal tool. As a result, the block-out device would not accidentally or undesirably be removed by various available tools, such as a screwdriver or other flat tool.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A device for covering a fiber optic adapter, the device comprising:
    a front portion and a back portion with an opening therebetween, wherein the back portion having at least one cover;
    the at least one cover having a top, a bottom, sidewalls and a back, wherein the top of the cover includes a locking arm extending therefrom, the locking arm having a first portion, a second portion extending from the first portion and a third portion extending from the second portion;

wherein the third portion of the locking arm includes a downwardly extending member that is positioned within the opening between the front portion and the back portion, the downwardly extending member of the third portion includes a flange extending outwardly towards one of the sidewalls of the cover;

wherein the locking arm is adapted to engage a latch within the adapter upon installation of the cover within the adapter;

an opening in the front portion for receiving a removal tool; and a sealing member extending from the front portion, the sealing member for sealing an opening in the adapter to block access to the locking arm when the cover is installed within the adapter;

whereby the back portion receives and covers a ferrule holder of the adapter.

2. The device of claim 1, wherein the first portion of the locking arm includes a vertically extending member that extends upwards from the top of the cover.

3. The device of claim 1, wherein the second portion of the locking arm includes a horizontally extending member and an upwardly extending member with a shoulder.

4. The device of claim 1, wherein the front portion includes an attachment member for engaging the removal tool.

5. The device of claim 1, wherein the device includes two covers for covering openings in the fiber optic adapter.

6. A device for covering a fiber optic adapter, the device comprising:

a front portion and a back portion with an opening therebetween, wherein the back portion having at least one cover;

the at least one cover having a top, a bottom, sidewalls and a back, wherein the top of the cover includes a locking arm extending therefrom, the locking arm having a first portion, a second portion extending from the first portion and a third portion extending from the second portion;

wherein the locking arm is adapted to engage a latch within the adapter upon installation of the cover within the adapter;

an opening in the front portion for receiving a removal tool; and a sealing member extending from the front portion, the sealing member for sealing an opening in the adapter to block access to the locking arm when the cover is installed within the adapter, wherein the sealing member has a vertical portion, a horizontal portion and an arcuate portion extending from the vertical portion to the front member;

whereby the back portion receives and covers a ferrule holder of the adapter.

7. The device of claim 5, wherein the first portion of the locking arm includes a vertically extending member that extends upwards from the top of the cover.

8. The device of claim 6, wherein the second portion of the locking arm includes a horizontally extending member and an upwardly extending member with a shoulder.

9. The device of claim 6, wherein the third portion of the locking arm includes a downwardly extending member that is positioned within the opening between the front portion and the back portion.

10. The device of claim 6, wherein the front portion includes an attachment member for engaging the removal tool.

11. The device of claim 6, wherein the device includes two covers for covering openings in the fiber optic adapter.

\* \* \* \* \*

UNITED STATES PATENT AND TRADEMARK OFFICE
CERTIFICATE OF CORRECTION

| | | |
|---|---|---|
| PATENT NO. | : 8,277,128 B2 | Page 1 of 1 |
| APPLICATION NO. | : 13/185973 | |
| DATED | : October 2, 2012 | |
| INVENTOR(S) | : Jason O. Hackett | |

It is certified that error appears in the above-identified patent and that said Letters Patent is hereby corrected as shown below:

The title on the Title page, Item (54) and in the Specification, Column 1, lines 1-2, which reads "BLOCK-OUT DEVICE FOR FIBER OPTIC CONNECTOR" should read "BLOCK-OUT DEVICE FOR FIBER OPTIC ADAPTER".

In the Claims:

Column 6, line 20 which reads "The device of claim 5, wherein the first portion of the" should read "The device of claim 6, wherein the first portion of the".

Signed and Sealed this
Fourth Day of March, 2014

Michelle K. Lee
*Deputy Director of the United States Patent and Trademark Office*